(12) United States Patent
Keutz

(10) Patent No.: US 6,860,508 B2
(45) Date of Patent: Mar. 1, 2005

(54) VEHICLE STEERING DEVICE

(75) Inventor: Markus Keutz, Rossdorf (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 44 days.

(21) Appl. No.: 10/264,240

(22) Filed: Oct. 3, 2002

(65) Prior Publication Data

US 2003/0067148 A1 Apr. 10, 2003

(30) Foreign Application Priority Data

Oct. 10, 2001 (DE) ...................................... 201 16 618 U

(51) Int. Cl.[7] .......................... B60R 21/16; B60R 21/20
(52) U.S. Cl. ................................. 280/731; 280/728.3
(58) Field of Search .............................. 280/731, 743.1, 280/735, 728.1, 728.2, 728.3

(56) References Cited

U.S. PATENT DOCUMENTS

| | | | | |
|---|---|---|---|---|
| 5,125,682 A | * | 6/1992 | Hensler et al. ............... | 280/731 |
| 5,691,695 A | * | 11/1997 | Lahiff .......................... | 340/461 |
| 6,049,747 A | | 4/2000 | Nakajima et al. | |
| 6,099,027 A | * | 8/2000 | Shirk et al. ................. | 280/728.3 |
| 6,135,494 A | * | 10/2000 | Lotito et al. ................. | 280/731 |
| 6,254,127 B1 | | 7/2001 | Breed et al. | |
| 6,400,835 B1 | * | 6/2002 | Lemelson et al. ........... | 382/118 |
| 6,474,688 B1 | * | 11/2002 | Bogren et al. ............... | 280/771 |
| 6,550,804 B2 | * | 4/2003 | Burdock ....................... | 280/731 |
| 6,561,538 B2 | * | 5/2003 | Ford et al. .................... | 280/731 |
| 6,739,620 B2 | * | 5/2004 | Derrick ......................... | 280/731 |
| 2003/0047922 A1 | * | 3/2003 | Ford et al. .................... | 280/731 |

FOREIGN PATENT DOCUMENTS

| | | | | |
|---|---|---|---|---|
| DE | 4023109 A1 | 1/1992 | | |
| DE | 44 14 216 C1 | 4/1995 | | |
| DE | 19545848 A1 | 6/1997 | | |
| DE | 19728226 A1 | 1/1999 | | |
| DE | 19740289 A | * 3/1999 | ........... | B60R/21/00 |
| DE | 19749914 A1 | * 5/1999 | ........... | B60R/21/16 |
| DE | 199 00 735 A1 | 7/2000 | | |
| DE | 19917890 A1 | 11/2000 | | |
| DE | 19932520 A1 | 2/2001 | | |
| DE | 19951029 A | * 3/2001 | ........... | B60R/21/22 |
| DE | 20105002 U | * 8/2001 | ........... | B62D/1/11 |

* cited by examiner

Primary Examiner—Paul N. Dickson
Assistant Examiner—Joselynn Y. Sliteris
(74) Attorney, Agent, or Firm—Tarolli, Sundheim, Covell & Tummino L.L.P.

(57) ABSTRACT

A vehicle steering device comprises a steering wheel. A sensor is disposed at the steering wheel, this sensor being adapted to detect in a contactless way data related to a driver of the vehicle.

13 Claims, 2 Drawing Sheets

VEHICLE STEERING DEVICE

TECHNICAL FIELD

This invention relates to a vehicle steering device including a steering wheel.

BACKGROUND OF THE INVENTION

It is expedient for many cases to detect and evaluate data on vehicle occupants, in particular the driver of the vehicle, either to improve the safety of the vehicle occupant or to increase the comfort thereof.

BRIEF SUMMARY OF THE INVENTION

This invention provides a simple possibility of detecting such data. According to the invention, a vehicle steering device comprises a steering wheel. A sensor is disposed at the steering wheel, this sensor being adapted to detect in a contactless way data related to a driver of the vehicle. The positioning of such sensor inside the steering wheel is particularly favorable, as normally a free line-of-sight path exists between driver and steering wheel, so that the sensor is not covered inadvertently.

In a preferred embodiment of the invention the sensor is a camera, advantageously a digital camera, which preferably is directed towards the driver. Favorably, the camera is connected with an electronic unit. In this way, e.g. the distance of the driver from the steering wheel as well as his actual posture can be determined, which is advantageous for defining the deployment parameters of a gas bag.

The camera and the electronic unit are preferably designed such that a picture of the driver can be recorded, evaluated and compared with a stored set of data and as a result the identity of the driver can be determined. This identity recognition is useful e.g. when the electronic unit is connected with an immobilizer system, the electronic unit being adapted to address the immobilizer system such that utilization of the vehicle can be prevented if the identity of the driver does not correspond with the stored set of data. The utilization of the vehicle can of course also be enabled for various persons.

The identity recognition can also be used to set predetermined vehicle parameters in a person-related way. In this case, the vehicle and the electronic unit are engineered correspondingly. Setting the seat and mirror positions, preselecting distinct radio stations or a particular telephone directory or presetting trigger parameters for safety means would be conceivable, to give only a few examples.

With a corresponding engineering of the electronic unit, the camera can also be used to record and evaluate data which allow to make a statement on the physical fitness of the driver, i.e. his attention or fitness to drive. For this purpose, e.g. eyelid position or eyelid movements, the frequency of yawning or eye movements can be evaluated. In case the electronic unit detects that the physical fitness or the attention of the driver decreases, the same is preferably alarmed optically and/or acoustically by a signal of a signal device connected with the electronic unit. Such monitoring might also be extended to stop the vehicle or make an emergency call in the case of a sudden deterioration of the physical condition of the driver (characterized for instance by a collapse).

In another preferred embodiment the sensor is designed such that it can be used to detect a distance between driver and steering wheel. This can be effected e.g. by means of infrared radiation or ultrasound. The corresponding transmitter preferably is disposed in direct vicinity of the sensor, but may also be mounted at another suitable place in the vehicle. The detected distance is preferably used to define the deployment parameters of a gas bag.

Preferably, the steering wheel has a gas bag module comprising a gas bag and a front-side covering cap which closes an outlet opening for the gas bag until deployment thereof, the sensor being disposed in the covering cap and the outlet opening extending around the sensor. In addition, a display and/or operating device can be disposed in the covering cap, the outlet opening for the gas bag extending around the display and/or operating device. Since the outlet opening extends around the sensor and the display and/or operating device, these components remain stationarily attached to the steering wheel, even if the covering cap bursts open. For signal transmission, there are provided devices which have already been developed in connection with multifunction switches and also in connection with the activation of the gas generator. The assembly of the steering wheel itself is very simple, and it can also be disassembled easily, which is a considerable advantage over the disassembly of sensors and display and/or operating devices arranged in the instrument panel. The covering cap can also have a centric depression or opening for accommodating the corresponding components.

Preferably, the outlet opening has a closed annular shape. The gas bag thus emerges from the gas bag module towards the occupant in a symmetric shape and centrally, i.e. in the vicinity of the hub.

Preferably, the gas bag also has an annular shape and moves through the outlet opening to the outside. In the deployed condition, the gas bag thus surrounds the sensor and the display and/or operating device, which upon deployment of the gas bag remain stationarily attached to the steering wheel. The gas bag may collapse radially inwards at its front wall, so that the indentation is not open as seen from the outside.

In accordance with one embodiment, the display and/or operating device is a screen for displaying various vehicle data. The screen is thus used universally and serves for instance as a speed display, a display of a navigation system, a radio display, a telephone display, a WAP screen, a PC display, a screen for forwarding and viewing e-mails or also, preferably in conjunction with a sensor constituting a camera, for representing video data for a videophone. The display and/or operating device can also be designed as a touch screen for the combined display and operation of a means or as a touch pad for operating vehicle elements.

DETAILED DESCRIPTION OF THE PREFERRED EMBODIMENT

Figure 1:
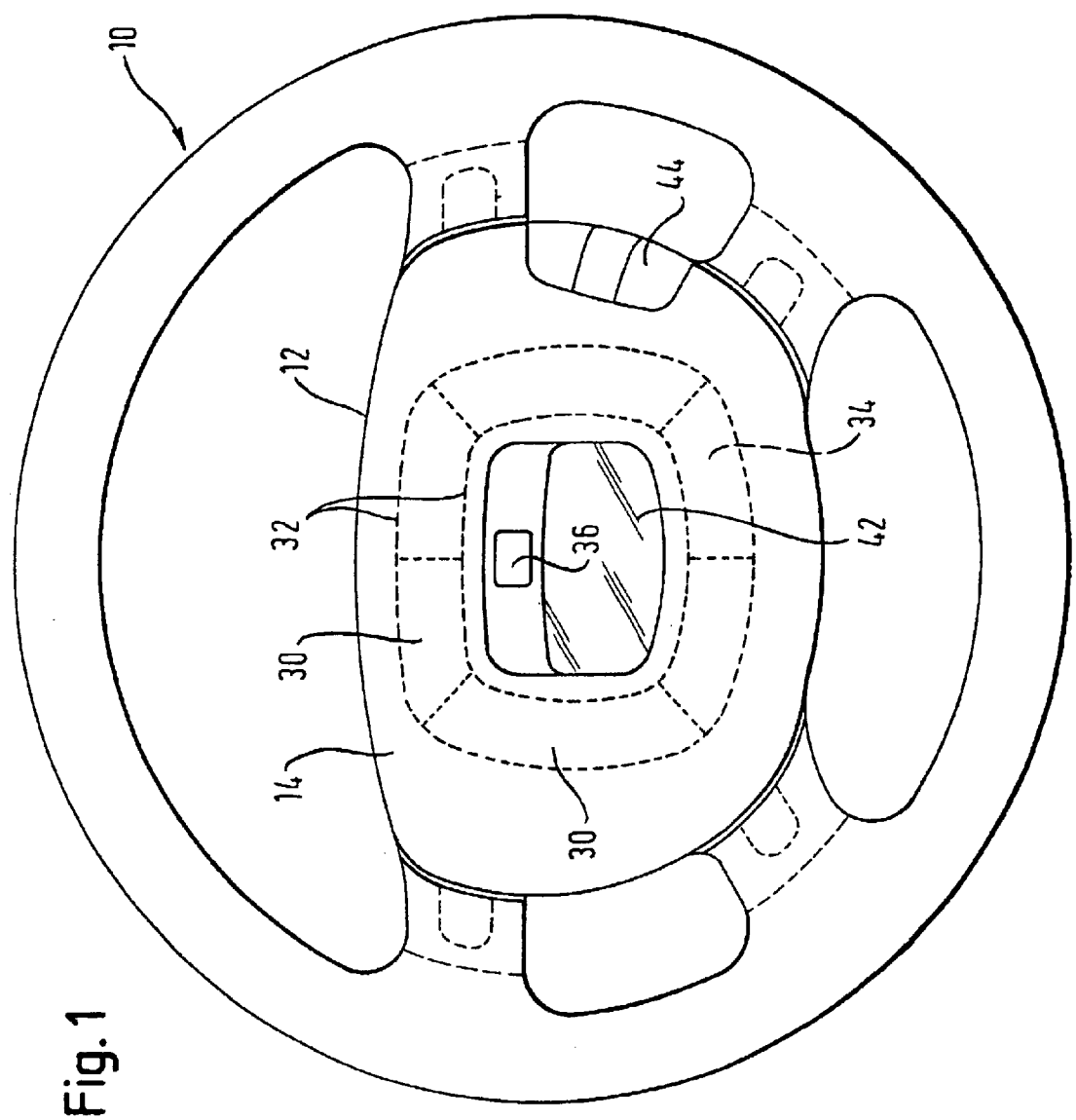
FIG. 1 shows a top view of a steering device according to the invention.
Figure 2:
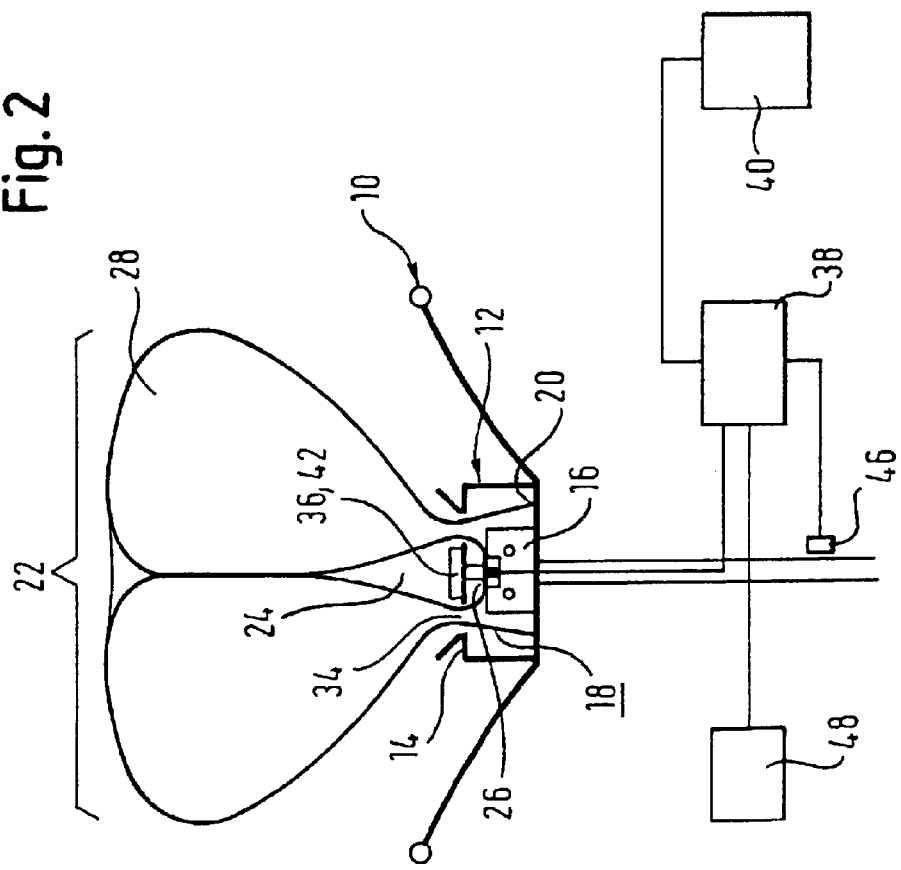
FIG. 2 shows a section through the steering device shown in FIG. 1 with deployed gas bag.

FIG. 1 shows a vehicle steering device with a steering wheel 10, in which a gas bag module 12 is accommodated in the vicinity of the hub. The gas bag module has a front-side covering cap 14 in the vicinity of the hub, a gas generator 16 and a gas bag 18. At its outer edge 20, the gas bag is attached to the bottom of the gas bag module 12. With respect to the deployed condition (see FIG. 2), the gas bag has a front wall 22 which the occupant impinges upon. The front wall 22 verges into an indentation 24, which is formed in that a centric portion of the gas bag wall remains attached to the gas generator 16 via a fastening device 26 and is thus prevented from moving out of the gas bag module 12. In the inflated condition, the gas bag thus has an annular shape with an annular chamber 28.

The covering cap 14 has numerous flaps 30, which are defined by predetermined film hinges and predetermined rupture lines 32. These flaps 30 close an outlet opening 34 for the gas bag 18, which outlet opening has a closed annular shape. The outlet opening 34 surrounds a sensor 36 centrally provided in the covering cap 14, which sensor preferably constitutes a camera. The sensor transmits its data to an electronic unit 38.

Figure 3:
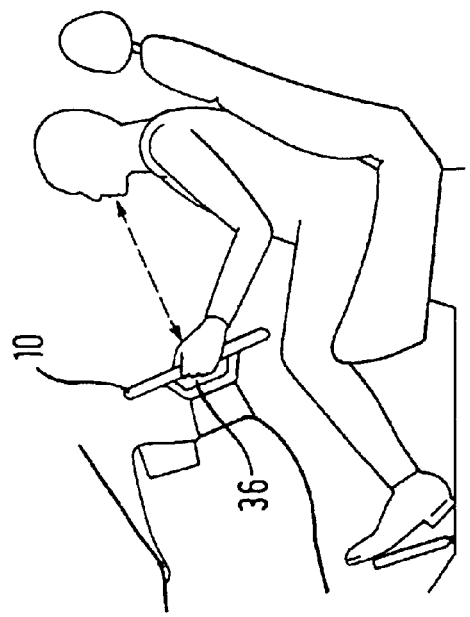
FIG. 3 shows a schematic view of a vehicle interior with a steering device according to the invention.

The sensor is directed towards the driver of the vehicle (see FIG. 3), so that it can detect data related to the same. It can detect e.g. the actual distance between steering wheel and head or chest of the driver, but also the exact position and posture of the driver. These data are preferably used to define in a known manner the parameters of a deployment of the gas bag such as e.g. the inflation hardness thereof, in order to be able to achieve an optimum protection for the driver. Preferably, the parameters are updated in brief intervals.

In addition, the degree of awareness of the driver can also be monitored e.g. by evaluating the eyelid movements, in order to possibly prevent the driver by means of an acoustic and/or optical signal generated by a signal device 48 from falling asleep.

In one possible embodiment, the identity of the driver can be determined via the data transmitted from the sensor 36, constituting a digital camera, to the electronic unit 38. To this end, one or more data sets are preferably stored in the electronic unit 38, which data sets are used for identification purposes. In dependence on the identity it may be provided to set vehicle parameters, such as e.g. the position of the vehicle seat or the mirrors, which were defined in accordance with a stored profile.

It is also possible to address an immobilizer system 40 via the electronic unit 38, in order to prevent an unauthorized utilization of the vehicle, when the identity of the driver does not correspond to the stored profile.

In another embodiment, the sensor 36 is designed such that e.g. via infrared radiation or ultrasound the distance between sensor and driver can be determined in a known way. The corresponding sensor preferably is arranged in direct vicinity of the sensor or is even integrated in the same.

In the covering cap 14, there is also provided a display and/or operating device 42, here in the form of an LCD screen, which in dependence on the desired setting has at least one of the following functions: speed display, display of a navigation system, radio display, telephone display, WAP screen (loading/forwarding e-mails), PC display, video representation for a videophone and the like. The remaining displays already provided in the vehicle can also be effected via the LCD screen.

The display and/or operating device 42 likewise is permanently attached to the gas bag module 12 via the fastening means 26, so that it remains stationarily attached to the steering wheel 10 when the gas bag 18 is deployed and the covering cap 14 bursts open. Via multifunction switches 44 disposed at the steering wheel it is in addition possible to obtain different kinds of information and display the same on the screen. The display and/or operating device is likewise coupled to the electronic unit 38, which in turn is connected with a sensor 46 for detecting the steering-wheel angle. Moreover, the electronic unit 38 also receives the remaining data displayed on the display. The electronic unit 38 controls the display and/or operating device 42 such that independent of the steering angle the display will always be aligned horizontally. When the steering wheel 10 is rotated, the display is electronically "rotated" by the same angle in the opposite direction, so that the display is disposed horizontally despite cornering.

The display and/or operating device 42 can also include a touch screen, which represents a combined display and operating device. There are provided several fields with displays, which can be selected by touching the same, so that a menu is opened. Via the field "telephone", for instance, the entire screen can be used for representing the telephone directory, so that individual entries can be accessed very quickly. Via the field "radio", functions such as volume and selected frequency can be changed.

The display and/or operating device 42 can also include a pure control element in the form of a touch pad. During the standstill of the vehicle, the driver can for instance use this control panel to quickly move a pointer on an otherwise disposed screen and select functions by pressing on the touch pad. For instance, a display might be projected onto the windshield, which display can be changed via the touch pad by selecting functions or menus.

A combination of control elements and display devices in the center of the covering cap 14 is also possible.

In accordance with the preferred embodiments, the outlet opening 34 always has a closed annular shape. However, an open annular shape is also possible, e.g. a U-shaped outlet opening 34.

What is claimed is:

1. A vehicle steering device including a steering wheel, the improvement comprising a sensor disposed at said steering wheel, said sensor being adapted to detect in a contactless way data related to a driver of a vehicle, said steering wheel having a gas bag module comprising a gas bag and a front-side covering cap which closes an outlet opening for said gas bag until deployment thereof, said sensor being arranged in said covering cap and said outlet opening extending around said sensor, said gas bag being ring-shaped and moving to the outside of said covering cap through said outlet opening, and upon deployment of said gas bag, said sensor remains stationarily attached to said steering wheel.

2. The vehicle steering device as claimed in claim 1, wherein said sensor is a camera.

3. The vehicle steering device as claimed in claim 2, wherein said camera is directed towards a driver of said vehicle.

4. The vehicle steering device as claimed in claim 2, wherein said camera is connected with an electronic unit which can evaluate signals of said camera.

5. The vehicle steering device as claimed in claim 4, wherein said camera and said electronic unit are designed such that a picture of said driver can be recorded, evaluated, compared with a stored set of data, and, as a result, the identity of said driver can be determined.

6. The vehicle steering device as claimed in claim 5, wherein said electronic unit is connected with an immobilizer system and wherein said electronic unit is designed such that it can address said immobilizer system such that utilization of said vehicle is prevented if said identity of said driver does not correspond with a stored set of data.

7. The vehicle steering device as claimed in claim 4, wherein said camera and said electronic unit are designed such that data which allow to make a statement on the physical fitness of said driver can be recorded and evaluated.

8. The vehicle steering device as claimed in claim 7, wherein a signal device can be activated in dependence on said detected data.

9. The vehicle steering device as claimed in claim 4, wherein said electronic unit and said vehicle are designed such that predetermined vehicle parameters can be set in dependence on an identity of said driver.

10. The vehicle steering device as claimed in claim 1, wherein said sensor is designed such that via said sensor a distance between driver and steering wheel can be detected.

11. The vehicle steering device as claimed in claim 1, wherein said outlet opening has a closed annular shape.

12. The vehicle steering device as claimed in claim 1, wherein said gas bag has a front wall which an occupant can impinge upon, which front wall has a centric indentation extending as far as to said sensor.

13. A vehicle steering device including a steering wheel, the improvement comprising a sensor disposed at said steering wheel, said sensor being adapted to detect in a contactless way data related to a driver of a vehicle, wherein said steering wheel has a gas bag module comprising a gas bag and a front-side covering cap which closes an outlet opening for said gas bag until deployment thereof, said sensor being arranged in said covering cap and said outlet opening extending around said sensor, at least one of a display and an operating device being provided in said covering cap, said gas bag being ring-shaped and can move to the outside through said outlet opening, and upon deployment of said gas bag, said sensor remains stationarily attached to said steering wheel.

* * * * *